Figures 1, 1A, 1B:
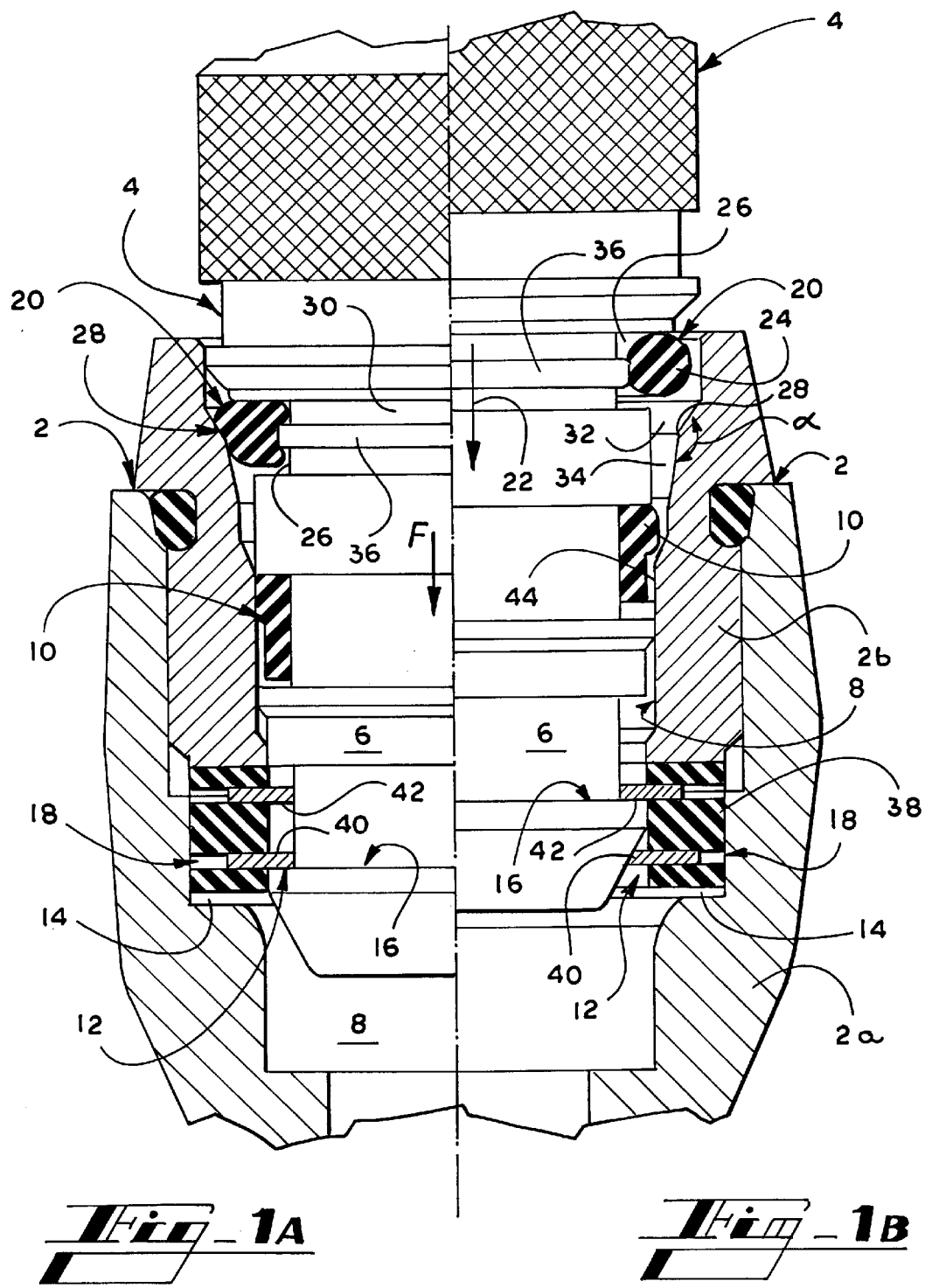

United States Patent [19]
Berg et al.

[11] Patent Number: 6,010,161
[45] Date of Patent: Jan. 4, 2000

[54] PLUG CONNECTION FOR PRESSURE SYSTEMS

[75] Inventors: Manfred Berg; Harald Hagen, both of Wipperfürth; Volker Kaminski, Halver, all of Germany

[73] Assignee: Armaturenfabrik Hermann Voss GmbH, Germany

[21] Appl. No.: 08/872,597

[22] Filed: Jun. 10, 1997

[30] Foreign Application Priority Data

Jun. 14, 1996 [DE] Germany .......................... 296 10 496

[51] Int. Cl.⁷ ..................................................... F16L 35/00

[52] U.S. Cl. ............................ 285/93; 285/321; 285/910; 285/918; 285/924

[58] Field of Search .............................. 285/93, 321, 924, 285/910, 918

[56] References Cited

U.S. PATENT DOCUMENTS

| | | | |
|---|---|---|---|
| 2,413,106 | 12/1946 | Kelle | 285/321 X |
| 3,637,239 | 1/1972 | Daniel | 285/321 X |
| 3,929,357 | 12/1975 | DeVincent et al. | 295/924 X |
| 4,278,276 | 7/1981 | Ekman | 285/321 X |
| 4,707,000 | 11/1987 | Torgardh | 285/924 X |
| 5,662,359 | 9/1997 | Kargula | 285/93 |
| 5,681,060 | 10/1997 | Berg et al. | 285/321 X |

*Primary Examiner*—Dave W. Arola
*Attorney, Agent, or Firm*—Jones & Askew

[57] ABSTRACT

A plug connection for a pressure system comprising a receptacle part and a plug part, the plug part is inserted into the receptacle part and retained therein by a locking device which forms a prelocked, unsealed connection and a locked, sealed connection between the plug part and the receptacle part with a limit stop element which indicates when the locked, sealed connection has been obtained.

5 Claims, 2 Drawing Sheets

PLUG CONNECTION FOR PRESSURE SYSTEMS

The present invention pertains to a plug connection for pressure systems which consists of two coupling parts, namely a receptacle part and a plug part, wherein the plug part can be inserted into a receptacle opening of the receptacle part in a such a manner that its plug shaft is circumferentially sealed and the plug part is blocked from being separated by means of a locking device, and wherein the locking device comprises at least one elastic holding element that is arranged in a recess of one coupling part and, in the connected position, engages behind an edge of the other coupling part in locking fashion.

One example of such a plug connection is known from EP-B-0,005,856. Plug connections of this type are, for example, used in brake systems for motor vehicles, in particular, compressed air brake systems for trucks. In this case—but naturally not only in this case—it is considered problematic that the assembly personnel frequently does not pay sufficient attention to producing a correct and complete plug connection, e.g., in case of unfavorable space conditions or installation situations. Consequently, it is necessary to carry out test procedures so as to prevent the connection from suddenly and unintentionally separating once the plug connection is charged with pressure, e.g., when the brake pressure is built up.

EP-B-0,226,689 discloses a "coupling device;" in order to eliminate the aforementioned problem, a "prelocking" of the coupling is ensured if a complete plug connection between the coupling parts is not produced. This prelocking prevents the connection from being entirely separated once it is charged with pressure. However, this variation requires an additional expenditure within the region of the locking device.

The present invention is based on the objective of developing a plug connection of this type which has a particularly favorable design with respect to constructive considerations as well as the manufacturing technology, and significantly reduces the risk of producing faulty plug connections.

According to the invention, this objective is attained by arranging a limit stop element between the two coupling parts in a manner such that, during the insertion of the plug part, a noticeable increase in the coupling force required for producing the plug connection is caused during or shortly after the connected position is reached due to the fact that the lint stop element regionally produces an axial contact between the coupling parts.

Due to the invention, the assembly person who manually produces the plug connection perceives this increase in the coupling force to be exerted in the form of a definite resistance. If the plug connection is produced by machines, the increase in force could also be determined metrologically with suitable means. This increase in the coupling force required for producing the plug connection is a clear indication of the fact that the connected position, i.e., the interlocking of the plug parts, has actually occurred, because the increase in force in accordance with the invention does not occur before the holding element is securely locked. Consequently, the invention significantly reduces or even entirely eliminates the risk of producing faulty plug connections, because the process of producing the plug connection is actually carried out completely until the "point of a definite increase in force" is reached.

However, if the assembly person completes the process of manually producing the plug connection before the connected position according to the invention is reached, i.e., before the aforementioned increase in the coupling force occurs, it may be advantageous to design the locking device in a manner such that a fully locked position which corresponds to the previously described connected position as well as a prelocked position which corresponds to a partially connected position are ensured. In this case, it is preferred—essentially in accordance with the initially mentioned EP-B-0,226,689—that a signal, in particular, in the form of an acoustically perceivable leakage noise, be generated by the incomplete seal produced in the partially connected position if the plug connection is charged with pressure. Naturally, a complete and pressure-tight seal is produced in the fully locked position. In this case, the aforementioned signal is an indication of the fact that an incorrect plug connection has been produced, i.e., the respective coupling parts can be further inserted into one another until the fully locked position is reached. However, completely separation of the coupling parts from one another can be prevented. In this preferred embodiment of the plug connection with "two locking positions" or a "double lock," the limit stop element according to the invention is designed in a manner such that the "point of a definite increase in force" occurs in or shortly behind the fully locked position, because this position corresponds to the connected position.

According to the invention, it is particularly advantageous to design the limit stop element elastically such that am "elastic limit stop" is ensured; due to the unavoidable manufacturing tolerances, a "rigid limit stop" could only be realized with high expenditures.

Additional advantageous characteristics of the invention are and explained in detail in the following description.

Figure 2:
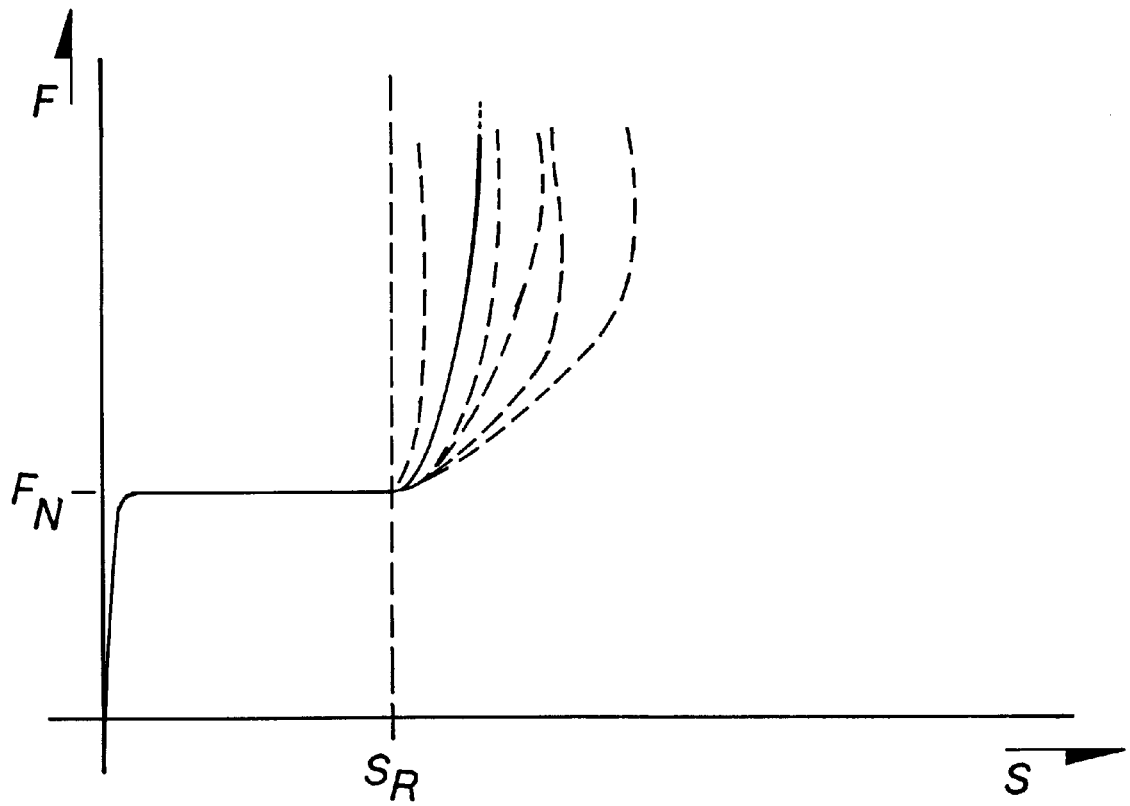

Preferred embodiments of the invention are described in detail below with reference to the figures. The figures show:

FIG. 1, a partial axial section through a plug connection according to the invention with two locking positions, in which the fully locked position is illustrated in the left half of the figure (FIG. 1a) and the prelocked position is illustrated in the right half of the figure (FIG. 1b), and FIG. 2, a simplified schematic diagram of the coupling force in dependence on the insertion path.

FIG. 1 shows that the plug connection according to the invention consists of a receptacle part 2 and a plug part 4. The plug part 4 comprises a plug shaft 6 that can be inserted into a receptacle opening 8 of the receptacle part 2 such that the plug shaft is sealed relative to the receptacle opening 8 by means of at least one circumferential seal 10 and blocked from being separated in the fully connected position by means of a locking device 12 (see FIG. 1a).

The locking device 12 comprises at least one radially elastic holding element 18 that is arranged in a recess 14 of one coupling part, namely in the recess 14 of the receptacle part 2 which is realized in the form of an inner annular groove in the embodiment shown, and, in the connected position, engages behind an edge 16 of the other coupling part, i.e., the plug part 4, in positively locking fashion.

According to the invention, a limit stop element 20 is arranged between the two coupling parts 2, 4 in a manner such that, during the insertion of the plug part 4 (in the direction of the arrow 22 in FIG. 1), a noticeable increase in the coupling force F required for producing the plug connection is caused no earlier than or shortly after reaching the connected position (FIG. 1a) due to the fact that the limit stop element 20 regionally produces an axial contact between the coupling parts 2, 4. In this case, the limit stop element 20 is preferably realized elastically, i.e., the limit stop according to the invention pertains to an "elastic limit stop."

FIG. 2 shows a diagram of the coupling force F required for producing the plug connection in dependence on the insertion path S. This diagram is highly schematic with respect to the fact that all changes in the coupling force F caused by the locking device or the sealing elements are not illustrated in the characteristic. Starting at the point of origin, the coupling force is initially increased to a "normal" coupling force $F_N$ when the plug shaft 6 is inserted into the receptacle opening 8 of the receptacle part 2. Once the required lock is produced in the locked position $S_R$, the force F is suddenly increased, namely in dependence on the elasticity of the limit stop element 20 according to the invention, i.e., in accordance with the respective spring characteristic of the elastic limit stop element 20. This increasing characteristic may, starting at the point $S_R$, be realized nearly arbitrarily by correspondingly selecting the material and/or the shape, in particular, the cross section, of the limit stop element 20 and/or by correspondingly designing the contact region between the two coupling parts 2, 4. Examples of this aspect are indicated in FIG. 2 by different characteristics drawn in broken lines.

It is preferred that the limit stop element 20 be realized in the form of a ring 24 that consists of an elastically deformable material. This ring is situated in a radial recess of one coupling part, in particular, in an outer annular groove 26 of the plug part 4, and cooperates with a step edge 28 of the other coupling part, in particular, with a step edge 28 of the receptacle part 2 which reduces the cross section of the receptacle opening 8. This means that the limit stop element 20 is axially "clamped" between a contact surface 30 that limits the outer annular groove 26 and the step edge 28 in the connected position (FIG. 1*a*). In this case, it is possible to exactly define or control the increase in the coupling force according to the invention, e.g., by correspondingly shaping the step edge 28. In the preferred embodiment shown, the step edge 28 is arranged between two conical surface sections 32, 34 that, in particular, form an obtuse angle $\alpha > 90°$. Consequently, the limit stop element 20 is also radially compressed to a certain degree during its axial compression, i.e., the increase in the coupling force can be influenced.

The increase in the coupling force can also be influenced by a special design of the recess that accommodates the limit stop element 20, i.e., the other annular groove 26 of the plug part 4 shown in the figure. The figure indicates that an essentially radially extending projection 36, in particular, a radial projection in the form of an annular web, may be arranged within the recess or outer annular groove 26, namely such that an elastic prestress is attained due to a certain radial widening of the limit stop element 20. This measure ensures a rigid, secure seat of the limit stop element 20 in the outer annular groove 26. The radial projection 36 or annular web is preferably arranged approximately within the central region of the outer annular groove 26 of the plug part 4. In this case, the limit stop element 20 is preferably realized in the form of a conventional O-ring with essentially circular cross section.

The latter described embodiment is particularly advantageous in combination with a special embodiment of the locking device 12, in which the locking device 12 ensures a completely connected or fully locked position that corresponds to the previously described connected position (FIG. 1*a*) as well as a prelocked position that corresponds to a partially connected position. In the partially connected position, the seal produced is preferably so incomplete that, if the plug connection is charged with pressures a signal, in particular, in the form of an acoustically perceivable leakage noise, is generated. Naturally, a complete and pressure-tight seal is produced in the fully locked position. This means that a defined leakage flow occurs in the partially connected or prelocked position (FIG. 1*b*). In this case, the previously described measure for generating an elastic radial prestress of the limit stop element 20 is particularly advantageous with respect to the fact that—due to the elastic widening of the ring 24—the ring 24 is secured from being "blown out" or "washed out" of the outer annular groove 26.

Concrete constructive measures for such an embodiment of the locking device 12 which also ensure a prelocked position of the plug components are—in addition to the initially cited EP-B-0,226,689—also described in numerous older applications of the applicant. For example, we refer to German Patent Application No.s 19,522,052.8, 19,523,830.3, 19,523,831.1 and 19,523,833.8 in their entirety. These applications respectively attain a "double-locking effect" due to the positive engagement of a catch element. In addition, we refer to a German application with the internal representative file No. 7947 which discloses a prelocking effect that, in particular, is attained due to a positive or positive/nonpositive connection.

The embodiment of the locking device 12 shown in the figures corresponds to the embodiment according to German Patent Application No. 19,621,535.8. In this case, the holding element 18 consists of a carrier element 38 situated in the recess 14 and two catch elements 40, 42 that are held in the carrier elements 38 in elastically deformable fashion and arranged axially behind one another, namely such that one catch element 42 engages behind the edge 16 in the prelocked position—see FIG. 1*b*—and the other catch element 40 engages behind said edge in the fully locked position—see FIG. 1*a*. Regarding additional details, we refer to the aforementioned application in its entirety.

If a prelocked position according to FIG. 1*b* is provided, it is advantageous to protect the main circumferential seal 10 from being "blown out" by the defined leakage flow. Concrete measures regarding this aspect are disclosed in the older patent application No. 19,536,333.7 of the applicant. This embodiment shows that the circumferential seal 10 is realized in a manner such that it already radially adjoins the inner surface of the receptacle opening 8 in the prelocked position via circumferentially distributed contact points 44 that are spaced apart from one another. Axial leakage gaps are formed in the circumferential direction between the respective contact points 44. The circumferential seal 10 preferably consists of a profiled elastic ring that is divided into two axially adjacent regions, namely into a sealing region with an annular cross section that is essentially constant over the entire circumference as well as a leakage region consisting of contact sections and radial recesses that for the leakage gaps. These contact sections and radial recesses alternately form the contact points 44 in the circumferential direction. The aforementioned application also discloses other alternatives; i.e., we hereby refer to this application in its entirety.

It is advantageous to arrange the limit stop element 20 or the ring 24 within the region between the main circumferential seal 10 and the end of the receptacle opening 8 on the insertion side. Due to this measure, the elastic ring 24 additionally acts as a seal against the admission of dirt, moisture and the like, e.g., as a so-called "dust seal", in the fully locked position according to FIG. 1*a*. In addition, the elastic limit stop element 20 advantageously compensates or prevents an axial play of the plug part 4 in the connected position (FIG. 1*a*) because the limit stop element exerts a prestress force (spring force) upon the plug part 4 in the separating direction, i.e., the plug part 4 is always held in contact with the receptacle part 2 via the holding element 18.

It should also be mentioned that it is preferred to realize the receptacle part 2 from two separate parts that are connected to one another in separable fashion in order to simplify the removal of the plug part 4 that is locked in position by the locking device 12. The receptacle part consists of a base part 2a and an insert part 2b that is preferably realized in the form of a male fitting. After removing the insert part 2b from the base part 2a, the plug part 4 can be removed together with part of the locking device 12, i.e, the holding element 18, and the insert part 2b.

The invention is not limited to the embodiments shown and described, but also includes all embodiments that function identically in the sense of the invention.

We claim:

1. A plug connection for pressure systems, comprising:

two coupling parts, a receptacle part (2) and a plug part (4) forming a plug shaft (6) and seal means carried by one of said parts;

the plug part (4) being insertable into a receptacle opening (8) of the receptacle part (2) such that the plug shaft (6) is circumferentially sealed by said seal means relative to the receptacle opening and is blocked from being separated by means of a locking device (12);

the locking device (12) comprising at least one elastic holding element (18) arranged in a recess (14) of one coupling part and, in a connected position of the coupling parts, engaging in locking fashion behind an edge (16) of the other coupling part;

a limit stop element (20) arranged between the two coupling parts (2, 4) to apply an axial contact between the coupling parts during insertion of the plug part (4) so as to cause a noticeable increase, during or shortly after the connected position is reached, in the coupling force required for coupling the plug connection;

the limit stop element (20) comprising a ring (24) of elastically deformable material, the ring being arranged in a radial recess or groove (26) of one coupling part and cooperating with a step edge (28) of the other coupling part;

the step edge (28) being arranged between two surface sections (32, 34) that form an obtuse angle >90°; and a substantially radially extending projection (36) arranged within the recess (26) to engage the limit stop element (20) so as to produce an elastic radial prestress of the limit stop element.

2. Plug connection according to claim 1, characterized in that the limit stop element (20) is in the form of a O-ring with essentially circular cross section.

3. Plug connection according to claim 1, characterized in that the locking device (12) is selectively operable to a completely connected position which corresponds to the connected position as well as a partially connected position that corresponds to a prelocked position, wherein the seal produced by said seal means in the partially connected position is so incomplete that, an acoustically perceivable leakage noise is generated if the plug connection is charged with pressure.

4. Plug connection according to claim 1, characterized in that the limit stop element (20) is arranged within the region between said seal means (10) that functions as the main pressure seal and the end of the receptacle opening (8) on the insertion side.

5. Plug connection according to claim 1, characterized in that, in the connected position, the limit stop element (20) exerts an elastic prestress force upon the plug part (4) in the separating direction and thusly compensates axial play of the plug part.

* * * * *